US005910355A

United States Patent [19]

Burgess

[11] Patent Number: 5,910,355

[45] Date of Patent: Jun. 8, 1999

[54] PRESSURE ACTIVATED SWITCHING DEVICE

[76] Inventor: Lester E. Burgess, Box 522, Swarthmore, Pa. 19081

[21] Appl. No.: 08/956,582

[22] Filed: Oct. 23, 1997

Related U.S. Application Data

[62] Division of application No. 08/429,683, Apr. 27, 1995, Pat. No. 5,695,859.

[51] Int. Cl.[6] .......... B32B 9/00

[52] U.S. Cl. .......... 428/209; 428/465; 428/464; 428/901; 200/84 B

[58] Field of Search .......... 200/85 R, 86 R, 200/86.5, 84 B; 428/209, 901, 464, 465

[56] References Cited

U.S. PATENT DOCUMENTS

| | | | |
|---|---|---|---|
| 2,951,817 | 9/1960 | Myers | 252/511 |
| 3,315,050 | 4/1967 | Miller | 200/61.43 |
| 3,321,592 | 5/1967 | Miller | 200/61.43 |
| 3,634,334 | 1/1972 | Burgess | 252/514 |
| 3,668,337 | 6/1972 | Sinclair | 200/5 A |
| 3,693,026 | 9/1972 | Miller | 200/61.43 |
| 3,859,485 | 1/1975 | Blinkilde et al. | 200/85 A |
| 4,014,217 | 3/1977 | Lagasse et al. | 73/865.7 |
| 4,051,336 | 9/1977 | Miller | 200/61.43 |
| 4,121,488 | 10/1978 | Akiyama | 84/720 |
| 4,137,116 | 1/1979 | Miller | 156/269 |
| 4,143,367 | 3/1979 | Schestag | 340/540 |
| 4,172,216 | 10/1979 | O'Shea | 200/85 R |
| 4,200,777 | 4/1980 | Miller | 200/85 A |
| 4,273,974 | 6/1981 | Miller | 200/61.43 |
| 4,349,710 | 9/1982 | Miller | 200/61.43 |
| 4,481,815 | 11/1984 | Overton | 73/865.7 |
| 4,497,989 | 2/1985 | Miller | 200/86 R |
| 4,620,072 | 10/1986 | Miller | 200/81 R |
| 4,640,137 | 2/1987 | Trull et al. | 73/865.7 |
| 4,661,664 | 4/1987 | Miller | 200/86 R |
| 4,785,143 | 11/1988 | Miller | 200/61.43 |
| 4,837,548 | 6/1989 | Lodini | 338/47 |
| 4,845,323 | 7/1989 | Beggs | 200/85 R |
| 4,876,419 | 10/1989 | Lodini | 200/86 R |
| 4,876,420 | 10/1989 | Lodini | 200/86 R |
| 4,900,497 | 2/1990 | Lodini | 264/104 |
| 4,908,483 | 3/1990 | Miller | 200/61.43 |
| 4,920,241 | 4/1990 | Miller | 200/86 R |
| 4,951,985 | 8/1990 | Pong et al. | 293/102 |
| 4,954,673 | 9/1990 | Miller | 200/61.43 |
| 4,964,302 | 10/1990 | Grahn et al. | 73/865.7 |
| 4,972,054 | 11/1990 | Miller et al. | 200/61.43 |
| 4,977,386 | 12/1990 | Lodini | 338/114 |
| 5,010,774 | 4/1991 | Kikuo et al. | 73/862.046 |
| 5,019,797 | 5/1991 | Marstiller et al. | 338/333 |
| 5,019,950 | 5/1991 | Johnson | 200/85 R |
| 5,023,411 | 6/1991 | Miller et al. | 200/61.43 |
| 5,027,552 | 7/1991 | Miller et al. | 49/27 |
| 5,060,527 | 10/1991 | Burgess | 73/865.7 |
| 5,066,835 | 11/1991 | Miller et al. | 200/61.43 |
| 5,072,079 | 12/1991 | Miller | 200/61.43 |
| 5,089,672 | 2/1992 | Miller | 200/86 R |
| 5,132,583 | 7/1992 | Chang | 252/62.9 R |
| 5,264,824 | 11/1993 | Hour | 200/85 R |
| 5,477,217 | 12/1995 | Bergan | 340/933 |
| 5,510,812 | 4/1996 | O'Mara | 345/161 |

FOREIGN PATENT DOCUMENTS

| | | |
|---|---|---|
| 0167341 | 1/1986 | European Pat. Off. . |
| 0293734 | 12/1988 | European Pat. Off. . |
| 1942565 | 4/1971 | Germany . |
| 2026894 | 12/1971 | Germany . |
| 2045527 | 10/1980 | United Kingdom . |

*Primary Examiner*—William Krynski
*Assistant Examiner*—Cathy F. Lam
*Attorney, Agent, or Firm*—Dilworth & Barrese

[57] ABSTRACT

A pressure sensitive sparkless switching device includes a layer of piezoresistive cellular polymer foam, at least two conductive layers, and an insulative spacer element having at least one opening. When pressure is applied to the device the piezoresistive foam disposes itself through the opening of the spacer element and makes electrical contact between the conductive layers. The resistance of the piezoresistive foam varies with the amount of pressure applied to provide an analog as well as on-off function. The device may also provide multiple switching, and shear detection capabilities.

7 Claims, 14 Drawing Sheets

PRESSURE ACTIVATED SWITCHING DEVICE

This is a divisional of application Ser. No. 08/429,683 filed Apr. 27, 1995 U.S. Pat. No. 5,695,859.

BACKGROUND OF THE INVENTION

1. Field of the Invention

The present invention relates to a pressure actuated switching device for closing or opening an electric circuit, and particularly to a safety mat for operating and shutting down machinery in response to personnel movement onto the mat.

2. Background of the Art

Pressure actuated electrical mat switches are known in the art. Typically, such mat switches are used as floor mats in the vicinity of machinery to open or close electrical circuits.

For example, a floor mat switch which opens an electrical circuit when stepped on may be used as a safety device to shut down machinery when a person walks into an unsafe area in the vicinity of the machinery. Conversely, the floor mat switch can be used to close a circuit and thereby keep machinery operating only when the person is standing in a safe area. Alternatively, the floor mat switch may be used to sound an alarm when stepped on, or to perform some like function.

U.S. Pat. No. 4,497,989 to Miller discloses an electric mat switch having a pair of outer wear layers, a pair of inner moisture barrier layers between the outer wear layers, and a separator layer between the moisture barrier layers.

U.S. Pat. No. 4,661,664 to Miller discloses a high sensitivity mat switch which includes outer sheets, an open work spacer sheet, conductive sheets interposed between the outer sheets on opposite sides of the spacer sheet for contacting on flexure through the spacer sheet, and a compressible deflection sheet interposed between one conductive sheet and the adjacent outer sheet, the deflection sheet being resiliently compressible for protrusion through the spacer sheet to contact the conductor sheets upon movement of the outer sheets toward each other.

U.S. Pat. No. 4,845,323 to Beggs discloses a flexible tactile switch for determining the presence or absence of weight, such as a person in a bed.

U.S. Pat. No. 5,019,950 to Johnson discloses a timed bedside night light combination that turns on a bedside lamp when a person steps on a mat adjacent to the bed and turns on a timer when the person steps off of the mat. The timer turns off the lamp after a predetermined period of time.

U.S. Pat. No. 5,264,824 to Hour discloses an audio emitting tread mat system.

While such mats have performed useful functions, there yet remains need of an improved safety mat which can respond not only to the presence of force, but also to the amount and direction of force applied thereto.

Also, mat switches currently being used often suffer from "dead zones". Dead zones are non-reactive areas in which an applied forced does not result in switching action. For example, the peripheral area around the edge of the conventionally used mats is usually a "dead zone". In the active area where switching does occur there is a danger of sparking when the two metallic conductor sheets touch. It would be advantageous to have a mat in which dead zones and sparking are reduced or eliminated.

Also known in the art are compressible piezoresistive materials which have electrical resistance which varies in accordance with the degree of compression of the material. Such piezoresistive materials are disclosed in U.S. Pat. Nos. 5,060,527, 4,951,985, and 4,172,216, for example.

SUMMARY OF THE INVENTION

A pressure sensitive switching device is provided herein. In one embodiment the device comprises first and second conductive layers; a layer of compressible piezoresistive material disposed between the first and second conductive layers; and at least one insulative spacer element positioned between the piezoresistive material and at least one of the first and second conductive layers, the spacer element possessing a plurality of openings. The compressible piezoresistive material preferably has a resistance of from about 500 ohms to about 100,000 ohms when uncompressed and a resistance of from about 200 ohms to about 500 ohms when compressed. The first and second conductive layers each preferably have a resistance less than that of the piezoresistive layer. Preferably the resistance of the first and second conductive layers is less than half that of the piezoresistive layer. More preferably, the resistance of the first and second conductive layers is less than 10% that of the piezoresistive layer, and most preferably the conductive layers have a resistance less than 1% that of the piezoresistive layer. These resistances are the resistance as measured in the direction of current flow. The compressible piezoresistive material disposes itself through at least some of the openings of the spacer element to make electrical contact with the conductive layer spaced apart by the spacer element in response to force applied thereto.

In another embodiment the device comprises a spacer element having an insulative layer and an upper conductive layer, the spacer element having at least one opening; a layer of piezoresistive material positioned above the spacer element and being in electrical contact with the upper conductive layer; and a lower conductive layer positioned below the spacer element. At least a portion of the lower conductive layer can comprise a plurality of discrete electrodes individually positioned in alignment with a respective one of the openings.

In another embodiment, the device includes a plurality of insulative spacer elements positioned between the piezoresistive material and the base. The spacer elements, and preferably the base as well, each have an upper layer of conductive material and each have at least one aperture. The apertures are aligned, configured, and dimensioned to form at least one void space defined by stepped sides. The void has a relatively large diameter opening adjacent to the piezoresistive material and a relatively smaller diameter opening adjacent to the base. The spacer elements form a vertical stack of horizontally oriented layers, the conductive layer of the uppermost spacer element being in electrical contact with the piezoresistive material. When a downward force is applied to the device, the piezoresistive material is moved through the void into successive contact with the other conductive layers.

In yet another embodiment, the pressure activated switching device includes detection means responsive to shear force for making electrical contact between the piezoresistive material and an emitter or receiver electrode. Particularly, the device can include a primary and secondary receiver electrode, the primary electrode being contacted in response to a downward compressive force applied to the device, and a secondary receiver electrode being contacted in response to a shear force. Such detection means can include, for example, a spacer element which resiliently moves in response to shear or a projection of piezoresistive material exposed to the shear force and movable into contact with a secondary receiver electrode.

DETAILED DESCRIPTION OF PREFERRED EMBODIMENT(S)

The terms "insulating", "conducting", "resistance", and their related forms are used herein to refer to the electrical properties of the materials described, unless otherwise indicated. The terms "top", "bottom", "above", and "below", are used relative to each other. The terms "elastomer" and "elastomeric" are used herein to refer to material that can undergo at least 10% deformation elastically. Typically, "elastomeric" materials suitable for the purposes described herein include polymeric materials such as natural and synthetic rubbers and the like. As used herein the term "piezoresistive" refers to a material having an electrical resistance which decreases in response to compression caused by mechanical pressure applied thereto in the direction of the current path. Such piezoresistive materials typically are resilient cellular polymer foams with conductive coatings covering the walls of the cells.

"Resistance" refers to the opposition of the material to the flow of electric current along the current path in the material and is measured in ohms. Resistance increases proportionately with the length of the current path and the specific resistance, or "resistivity" of the material, and it varies inversely to the amount of cross sectional area available to the current. The resistivity is a property of the material and may be thought of as a measure of (resistance/length)/area. More particularly, the resistance may be determined in accordance with the following formula:

$$R=(\rho L)/A \qquad (I)$$

where

R=resistance in ohms

ρ=resistivity in ohm-inches

L=length in inches

A=area in square inches

The current through a circuit varies in proportion to the applied voltage and inversely with the resistance, as provided in Ohm's Law:

$$I=V/R \qquad (II)$$

where

I=current in amperes

V=voltage in volts

R=resistance in ohms

Typically, the resistance of a flat conductive sheet across the plane of the sheet, i.e., from one edge to the opposite edge, is measured in units of ohms per square. For any given thickness of conductive sheet, the resistance value across the square remains the same no matter what the size of the square is. In applications where the current path is from one surface to another of the conductive sheet, i.e., in a direction perpendicular to the plane of the sheet, resistance is measured in ohms.

Figure 1:
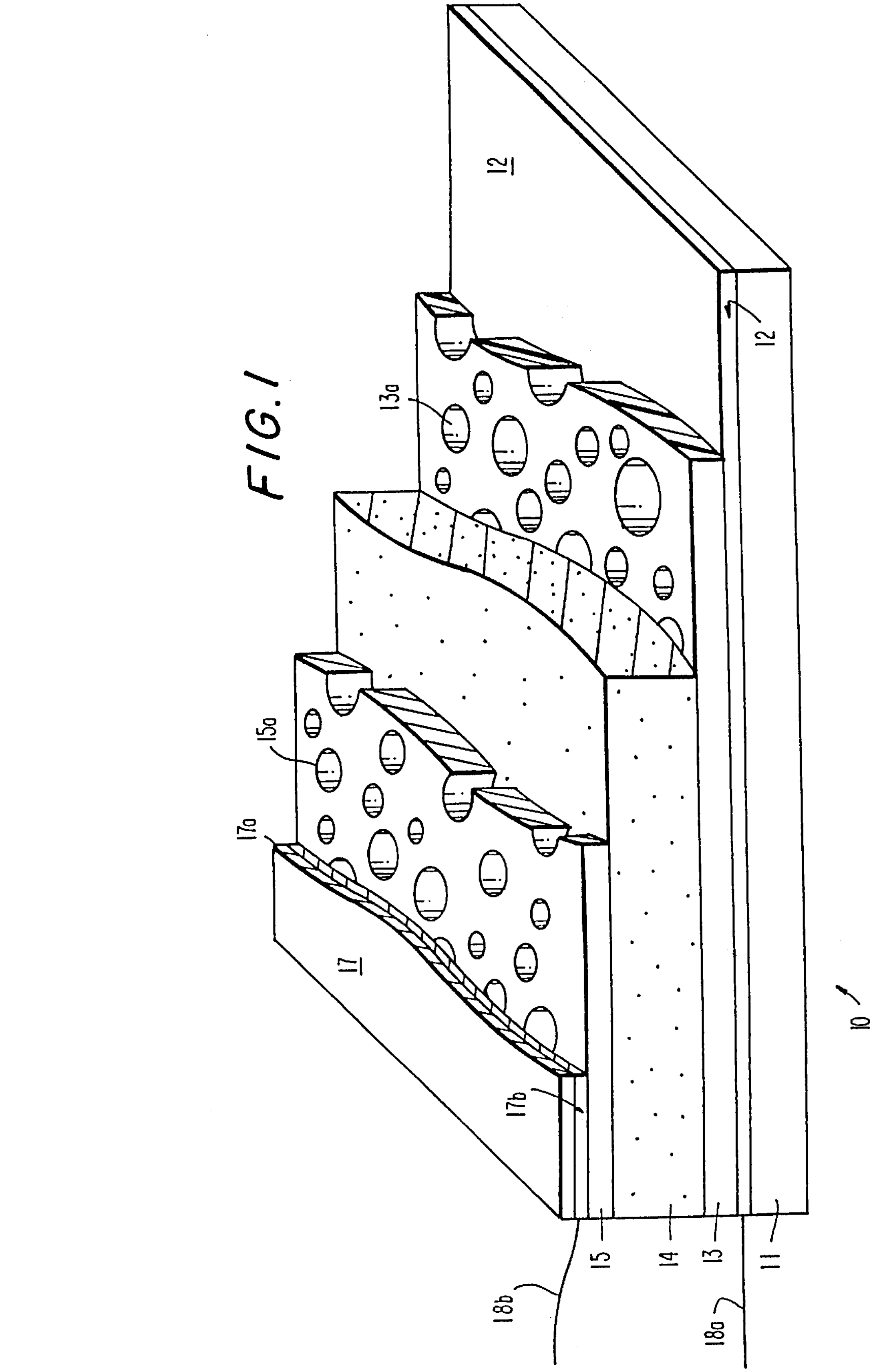
FIG. 1 is a partly cut away perspective view of the apparatus.

Referring to FIG. 1, the pressure activated mat switch 10 of the present invention includes a base 11 having a conductive layer 12 disposed thereon, a compressible piezoresistive material 14 sandwiched between two spacer elements, i.e., standoffs 13 and 15, and a preferably elastomeric cover sheet 17 with a conductive layer or film 17*b* on the underside thereof adjacent to one of the standoffs. While two spacer elements, i.e. standoffs 13 and 15 are shown, it should be appreciated that only one spacer element is needed, a second spacer element being preferred but optional.

More particularly, the base layer 11 is a sheet of any type of durable material capable of withstanding the stresses and pressures placed upon the safety mat 10 under operating conditions. Base 11 can be fabricated from, for example, plastic or elastomeric materials. A preferred material for the base is a thermoplastic such as polyvinyl chloride ("PVC") sheeting, which advantageously may be heat sealed or otherwise bonded to a PVC cover sheet at the edges to achieve a hermetic sealing of the safety mat. The sheeting can be, for example, ⅛" to ¼" thick and may be embossed or ribbed. Moreover, the base 11 can alternatively be rigid or flexible to accommodate various environments or applications.

Conductive layer 12 is a metallic foil, or film, applied to the top of the base 11. Alternatively, conductive layer 12 can be a plastic sheet coated with a conductive film 11. This conductive coating can also be deposited on base 11 (for example by electroless deposition). Conductive layer 12 can be, for example, a copper or aluminum foil, which has been adhesively bonded to base 11. The conductive layer 12 should preferably have a resistance which is less than that of the resistance of the piezoresistive material 14, described below. Typically, the conductive layer 12 has a lateral, or edge to edge resistance of from about 0.001 to about 500 ohms per square. Preferably, the resistance of the conductive layer 12 is less than half that of the piezoresistive layer 14. More preferably, the resistance of the conductive layer 12 is less than 10% that of the piezoresistive layer 14. Most preferably, the resistance of the conductive layer 12 is less than 1% that of the piezoresistive layer 14. Low relative resistance of the conductive layer 12 helps to insure that the only significant amount of resistance encountered by the current as it passes through the apparatus 10 is in that portion of the current path which is normal to the plane of the layers. Conductive layer 12 remains stationary relative to the base 11. However, another conductive layer 17*b*, discussed below, is resiliently movable when a compressive force is applied. Upper conductive layer 17*b* also has low resistance relative to the piezoresistive material, which is disposed between upper conductive layer 17*b* and lower conductive layer 12. Thus, the measured resistance is indicative of the vertical displacement of the conductive layer 17*b* and the compression of the piezoresistive foam 14, which, in turn, is related to the force downwardly applied to the device. The lateral position of the downward force, i.e. whether the force is applied near the center of the device or near one or the other of the edges, does not significantly affect the measured resistance.

Standoff layer 13 functions as a spacer element and comprises a sheet of electrically insulative material having a plurality of holes 13*a*, which may be an orderly array of similarly sized or dissimilarly sized openings, or, as shown, a random array of differently sized openings. Standoff 13 is preferably relatively rigid as compared to the foam layer 14 above it. Alternatively, standoff 13 may be a compressible and resilient polymer foam. The standoffs provide an on-off function. By separating the conductive piezoresistive material layer 14 from the conductive layer 12, the standoff 13 prevents electrical contact therebetween unless a downward force of sufficient magnitude is applied to the top of the mat switch 10. Thus, the size and configuration of the standoff 13 can be designed to achieve predetermined threshold values of force, or weight, below which the mat switch 10 will not be actuated. This characteristic also controls the force relationship to the analog output as the piezoresistive material or configuration is compressed. Upon application of a predetermined sufficient amount of force the conductive piezoresistive material 14 presses through holes 13*a* to make electrical contact with conductive layer 12 below. The predetermined minimum amount of force sufficient to actuate the switch depends at least in part on the hole diameter, the thickness of the standoff and layer 13, and the degree of rigidity of the standoff 13 (a highly rigid standoff requires greater activation force than a low rigidity, i.e., compressible, standoff). This principle applies to all of the switching devices herein which employ a standoff. Typically, the standoff 13 ranges in thickness from about 1/32 inches to about 1/4 inches. The holes 13*a* range in diameter from about 1/16 inches to about 1/2 inches. Other smaller or larger dimensions suitable for the desired application may be chosen. The dimensions given herein are merely for exemplification of one of many suitable size ranges.

The piezoresistive material 14 is preferably a conductive piezoresistive foam comprising a flexible and resilient sheet of cellular polymeric material having a resistance which changes in relation to the magnitude of pressure applied to it. Typically, the piezoresistive foam layer 14 may range from 1/16" to about 1/2", although other thicknesses may also be used when appropriate. A conductive polymeric foam suitable for use in the present apparatus is disclosed in U.S. Pat. No. 5,060,527. Other conductive foams are disclosed in U.S. Pat. Nos. 4,951,985 and 4,172,216.

Generally, such conductive foams can be open cell foams coated with a conductive material. When a force is applied the piezoresistive foam is compressed and the overall resistance is lowered because the resistivity as well as the current path are reduced. For example, an uncompressed piezoresistive foam may have a resistance of 100,000 ohms, whereas when compressed the resistance may drop to 300 ohms.

An alternative conductive piezoresistive polymer foam suitable for use in the present invention is an intrinsically conductive expanded polymer (ICEP) cellular foam comprising an expanded polymer with premixed filler comprising conductive finely divided (preferably colloidal) particles and conductive fibers. Typically, conductive cellular foams comprise a nonconductive expanded foam with a conductive coating dispersed through the cells. Such foams are limited to open celled foams to permit the interior cells of the foam to receive the conductive coating.

An intrinsically conductive expanded foam differs from the prior known expanded foams in that the foam matrix is itself conductive. The difficulty in fabricating an intrinsically conductive expanded foam is that the conductive filler particles, which have been premixed into the unexpanded foam, spread apart from each other and lose contact with each other as the foam expands, thereby creating an open circuit.

Surprisingly, the combination of conductive finely divided particles with conductive fibers allows the conductive filler to be premixed into the resin prior to expansion without loss of conductive ability when the resin is subsequently expanded. The conductive filler can comprise an effective amount of conductive powder combined with an effective amount of conductive fiber. By "effective amount" is meant an amount sufficient to maintain electrical conductance after expansion of the foam matrix. The conductive powder can be powdered metals such as copper, silver, nickel, gold, and the like, or powdered carbon such as carbon black and powdered graphite. The particle size of the conductive powder typically ranges from diameters of about 0.01 to about 25 microns. The conductive fibers can be metal fibers or, preferably, graphite, and typically range from about 0.1 to about 0.5 inches in length, Typically the amount of conductive powder range from about 15% to about 80% by weight of the total composition. The conductive fibers typically range from about 0.1% to about 10% by weight of the total composition.

The intrinsically conductive foam can be made according to the procedure described in Example 1 below. With respect to the Example, the silicone resin is obtainable from the Dow Corning Company under the designation SILASTIC™ S5370 silicone resin. The graphite pigment is available as Asbury Graphite A60. The carbon black pigment is available as Shawingigan Black carbon. The graphite fibers are obtainable as Hercules Magnamite Type A graphite fibers. A significant advantage of intrinsically conductive foam is that it can be a closed cell foam.

Example 1

108 grams of silicone resin were mixed with a filler comprising 40 grams of graphite pigment, 0.4 grams of carbon black pigment, 3.0 grams of ¼" graphite fibers. After the filler was dispersed in the resin, 6.0 grams of foaming catalyst was stirred into the mixture. The mixture was cast in a mold and allowed to foam and gel to form a piezoresistive elastomeric polymeric foam having a sheet resistance of about 50 K ohms/square.

The performed silicone resin can be thinned with solvent, such as methylethyl ketone to reduce the viscosity. The polymer generally forms a "skin" when foamed and gelled. The skin decreases the sensitivity of the piezoresistive sheet because the skin generally has a high resistance value which is less affected by compression. Optionally, a cloth can be lined around the mold into which the prefoamed resin is cast. After the resin has been foamed and gelled, the cloth can be pulled away from the polymer, thereby removing the skin and exposing the polymer cells for greater sensitivity.

When loaded, i.e. when a mechanical force or pressure is applied thereto, the resistance of a piezoresistive foam drops in a manner which is reproducible. That is, the same load repeatedly applied consistently gives the same values of resistance. Also, it is preferred that the cellular foam displays little or no resistance hysteresis. That is, the measured resistance of the conductive foam for a particular amount of compressive displacement is substantially the same whether the resistance is measured when the foam is being compressed or expanded.

Advantageously, the piezoresistive foam layer 14 accomplishes sparkless switching of the apparatus, which provides a greater margin of safety in environments with flammable gases or vapors present.

Adjacent to the piezoresistive foam 14 is another standoff 15, which has holes 15*a*. Standoff 15 is preferably identical to standoff 13. Alternatively, standoff 15 can be modified so as to differ from standoff 13 in thickness or the configuration and dimensions of the holes 13*a*.

The switching device 10 includes a cover sheet 17 comprising a non-conducting layer 17*a* which is preferably elastomeric (but can also be rigid); and a conducting layer 17*b*. The comments above with respect to the negligible resistivity of conductive layer 12 relative to that to the piezoresistive foam apply also to conductive layer 17*b*. The conducting layer 17*b* can be deposited on the upper non-conducting layer 17*a* so as to form an elastomeric lower conducting surface. The deposited layer 17*b* can also be a polymeric elastomer or coating containing filler material such as finally powdered metal or carbon to render it conducting. A conductive layer suitable for use in the present invention is disclosed in U.S. Pat. No. 5,069527, herein incorporated in its entirety.

An elastomeric conductive layer 17*b* can be fabricated with the conductive powder and fibers as described above with respect to the intrinsically conductive expanded polymer foam, with the exception that the polymer matrix for the conductive layer 17*b* need not be cellular. Preferably an elastomeric silicone is used as the matrix as set forth in Example 2.

Example 2

A conductive filler was made from 60 grams of graphite pigment (Asbury Graphite A60), 0.4 grams carbon black (Shawingigan Black A), 5.0 grams of ¼" graphite fibers (Hercules Magnamite Type A). This filler was disperse into 108.0 grams of silicone elastomer (SLYGARD™ 182 silicone elastomer resin) A catalyst was then added and the mixture was cast in a mold and allowed to cure.

The result was an elastomeric silicone film having a sheet resistance of about 10 ohms/square.

Alternatively, the cover sheet 17 can be flexible without being elastomeric and may comprise a sheet of metallized polymer such as aluminized MYLAR® brand polymer film, the coating of aluminum providing the conducting layer 17*b*. As yet another alternative, the cover sheet 17 can comprise an upper layer 17*a* flexible polymeric resin, either elastomeric or merely flexible, and a continuous layer 17*b* of metal foil. Preferably the upper layer 17*a* is a plasticized PVC sheeting which may be heat sealed or otherwise bonded (for example by solvent welding) to a PVC base 11. The advantage to using a continuous foil layer is the greater conductivity of metallic foil as compared with polymers rendered conductive by the admixture of conductive components.

The aforementioned layers are assembled as shown in FIG. 1 with conductive wires 18*a* and 18*b* individually connected, respectively, to conductive layers 12 and 17*b*. Wires 18*a* and 18*b* are connected to a power supply (not shown) and form part of an electrical switching circuit.

Figure 1A:
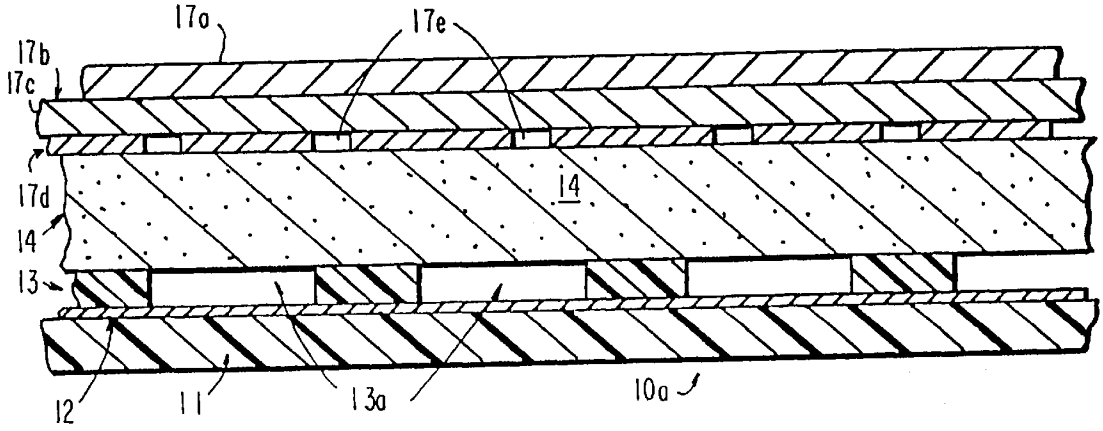
FIGS. 1A and 1B are sectional elevational views of a mat switch having a segmented conductive layer, in unactuated and actuated conditions, respectively.
Figure 1B:
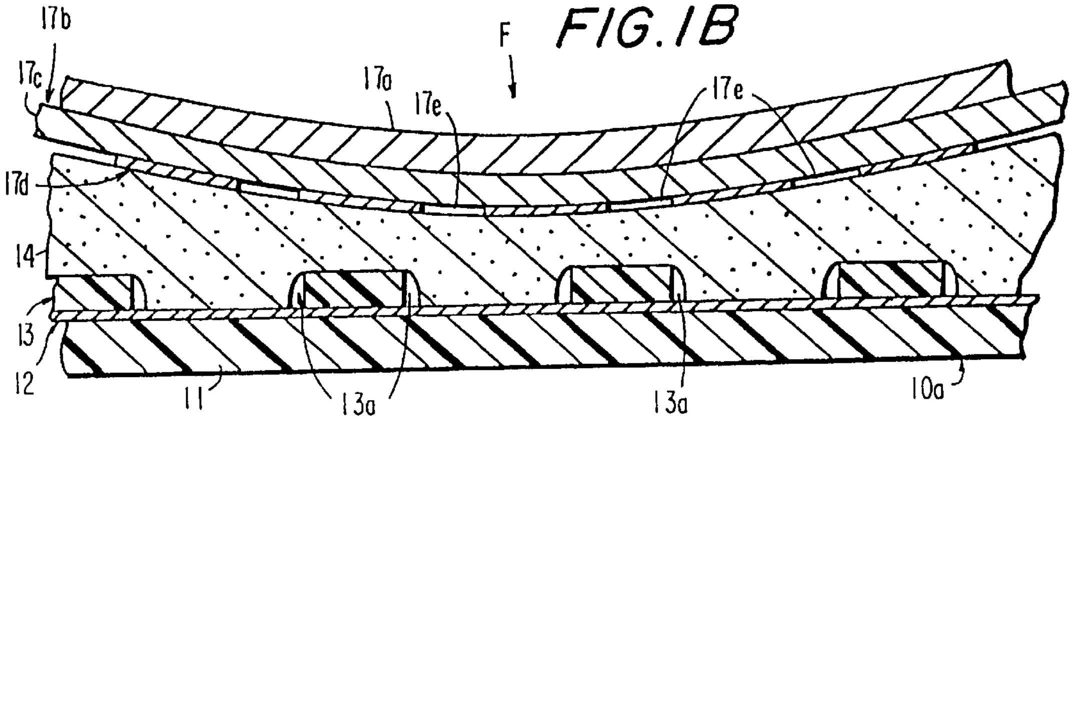

Referring to FIGS. 1A and 1B, as a further modification the conductive layer 17*b* can comprise a composite of conductive elastomeric polymer bonded to a segmented metal foil or a crinkled metal foil, the foil being positioned adjacent the standoff 15*a*, or, as shown in FIGS. 1A and 1B, the piezoresistive layer 14. Slits in the segmented foil (or crinkles in the crinkled foil) permit elastomeric stretching of the conductive layer 17*b* while providing the high conductivity of metal across most of the conductive layer 17*b*.

FIG. 1A shows a mat switch 10*a* with a conductive layer 17*b* bonded to an elastomeric insulative cover sheet 17*a*. Conductive layer 17*b* comprises an elastomeric conductive sheet 17*c* to which a segmented layer of metal foil 17*d* having slits 17*e* is bonded to the underside thereof. The piezoresistive material 14 is in contact with the segmented foil and is positioned above standoff 13. As shown in FIG. 1B, when a downward force F is applied to the top surface of mat switch 10*a*, the elastomeric layers 17*a* and 17*b* resiliently bend downward and stretch laterally. The piezoresistive material 14 is thereby pressed downward through apertures 13*a* in the standoff and into contact with conductive layer 12 on base 11. The gaps in the metal foil 17*d* defined by slits 17*e* spread a little bit wider. The electric current traverses these gaps through the elastomeric conductive sheet 17*c*. Since the gaps widen when the elastomeric sheet 17*c* is stretched the overall sheet resistance across the conductive layer 17*b* is slightly increased when the device is actuated. However, since the conductivity of the foil segments is much greater than that of the elastomeric conductor 17*c*, the overall conductivity of the elastomeric conductive layer 17*b* is similar to the that of the abovementioned continuous foil embodiment while also providing elastomeric operation.

Figure 2:
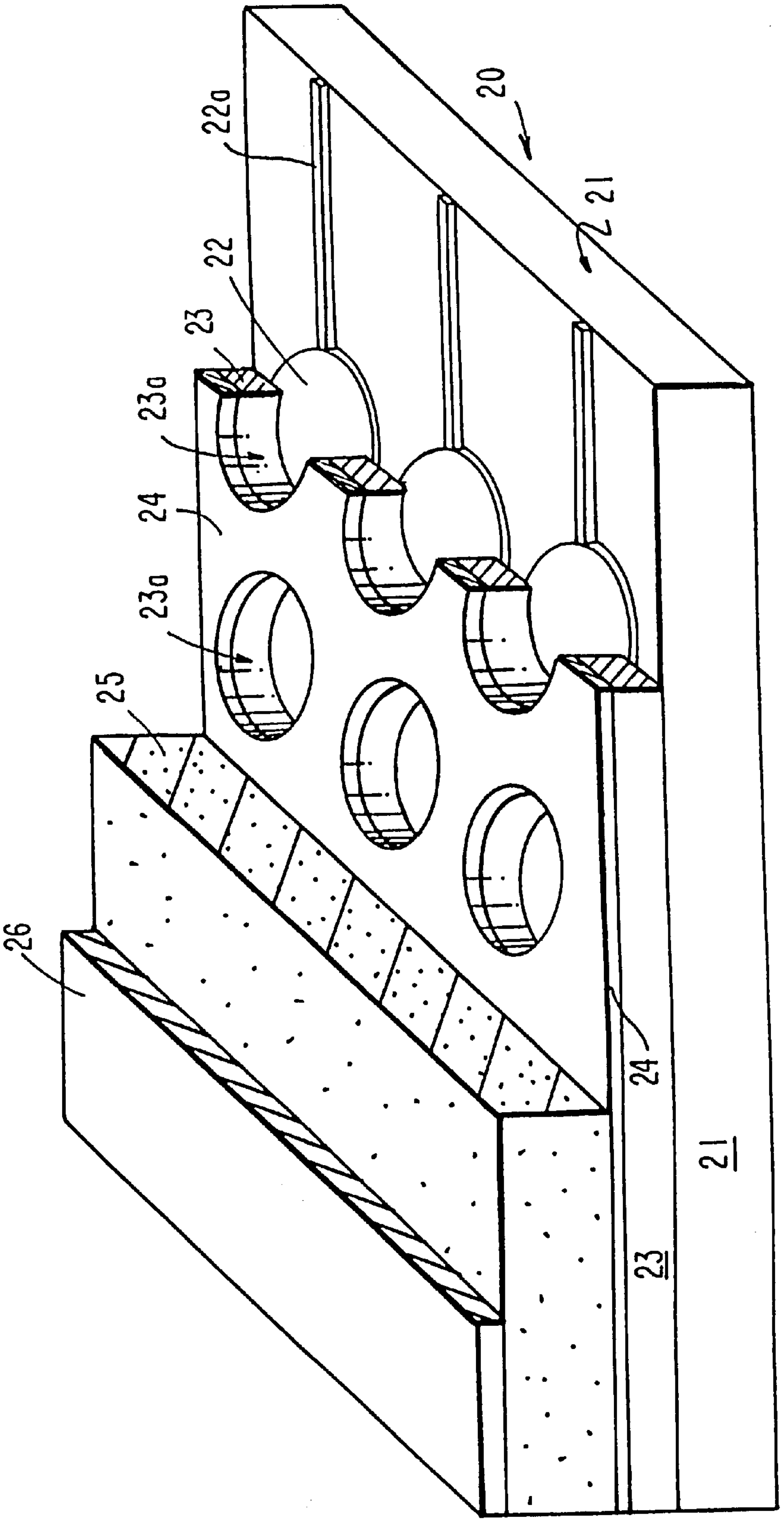
FIG. 2 is a partly cut away perspective view of an alternative embodiment of the apparatus.

Referring now to FIG. 2, another embodiment of the apparatus is shown wherein mat switch 20 comprises a base layer 21 with an array of discrete, laterally spaced apart conductive layers 22 which serve as electrodes. The insulative base 21 may conveniently be fabricated from a circuit board having a layer of copper. The copper layer may be selectively etched to form electrodes 22 with leads 22*a* for providing an electrical connection thereto. Alternatively, the electrodes 22 may be deposited or plated on base layer 21 through a pattern. This layer may also be a metal or otherwise conductive film. Those skilled in the art will recognize many ways to achieve a patterned layer of electrodes on an insulative substrate (for example, straight conductive lines remaining in one axis may be such electrodes).

Layer 23 is a standoff having a patterned array of holes 23$a$, each hole 23$a$ being aligned with a respective one of the electrodes 22. The top surface of the standoff 23 has a conductive layer 24 thereon. The conductive layer 24 can be a metal foil, plate, or film, and may be formed by any method suitable for the purpose such as plating, deposition, adhesion of a foil or plate, etc. Alternatively, this layer can be a circuit of electrodes designed to offer desired communication to the circuit 22 of layer 21 (for example, straight conductive lines running in orthogonal axes.

The piezoresistive foam 25 is positioned above the conductive layer 24 and is in electrical contact therewith. The insulative cover sheet 26, which can be an elastomeric or non-elastomeric flexible polymeric sheet, covers the piezoresistive foam 25.

As can readily be appreciated, when a downward force is applied to the top of cover sheet 26, the piezoresistive foam 25 is forced through holes 23$a$ into contact with electrodes 22, thereby completing the circuit and allowing current to flow between conductive layer or circuit 24 and electrodes 22. Unlike the previously described embodiment, the current does not flow from top to bottom of the piezoresistive foam 25, but through that portion of the foam 25 occupying the space defined by holes 23$a$.

Since the electrodes 22 are discrete, each with its own lead 22$a$, the lateral position of the applied force may be known by determining which of the electrodes 22 are receiving current.

In yet another alternative the standoff may be combined with a mesh or screen comprising a network of wires or filaments. Optionally, single piece sheets of insulating material having an array of perforations may be substituted for a filamentous or wire mesh. For example, referring to FIG. 3, spacer element assembly 19 is a combination of a coarse standoff 19$c$ sandwiched between two insulating mesh screens 19$a$ and 19$b$. Holes 19$d$ in the standoff 19$c$ have relatively wide diameters (as compared to the screen openings) and may be randomly, orderly, or mixed sized and spaced. The insulating screens 19$a$ and 19$b$ are preferably 20 mesh size and can range from 5 mesh to about 30 mesh. Spacer element assembly 19 may be substituted for one or the other of standoffs 13 or 15 in safety mat 10. Optionally, the other of the two standoffs may be eliminated. For example, a safety mat switch may be fabricated with a cover sheet 17, including an insulating cover 17$a$ and electrode film 17$b$; a piezoresistive foam 14 next to the electrode layer 17$b$; the spacer element assembly 19 adjacent the piezoresistive foam 14; a bottom electrode 12; and a base 11.

In yet another alternative, the spacer element assembly 19 may be fabricated with coarse standoff 19$c$ and only one of screens 19$a$ and 19$b$ adjacent thereto. Alternatively, the mat switch 10 can be constructed containing a mesh 19$a$ instead of having any spacer elements, the mesh itself functioning as the spacer element.

Figure 3:
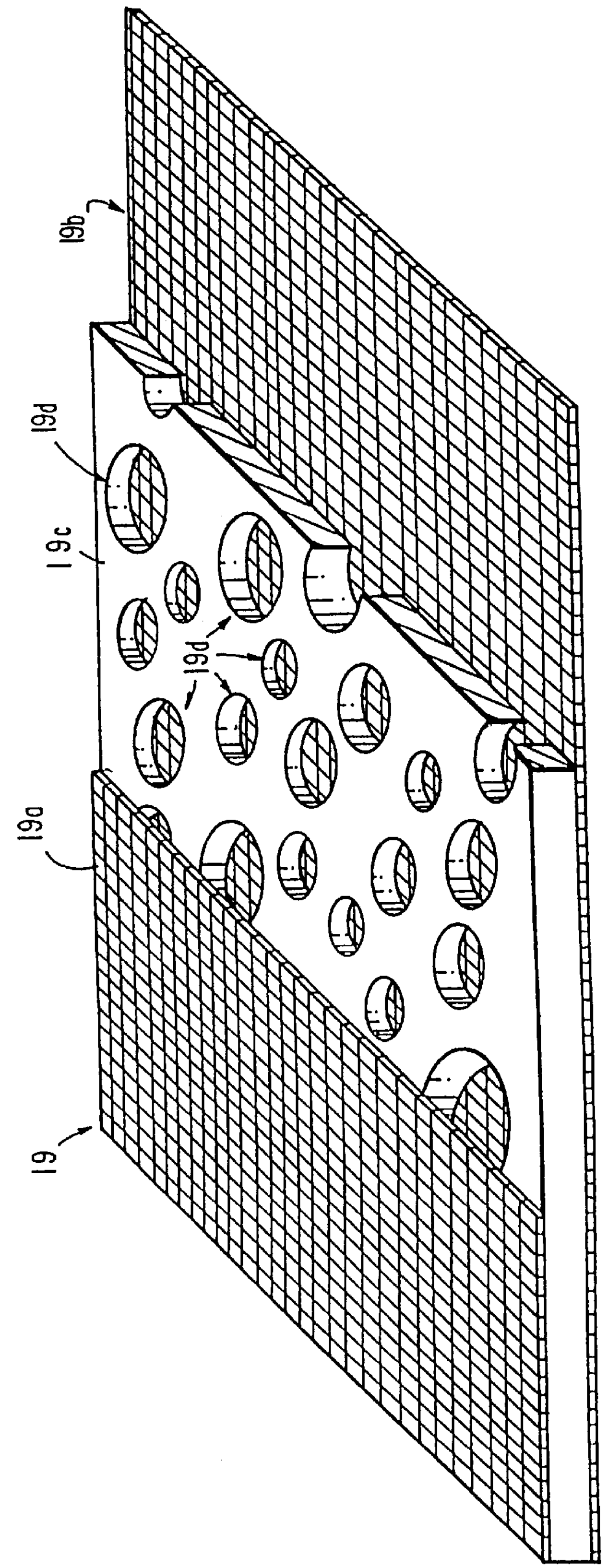
FIG. 3 is a partly cut away perspective view of a spacer element assembly.
Figure 3A:
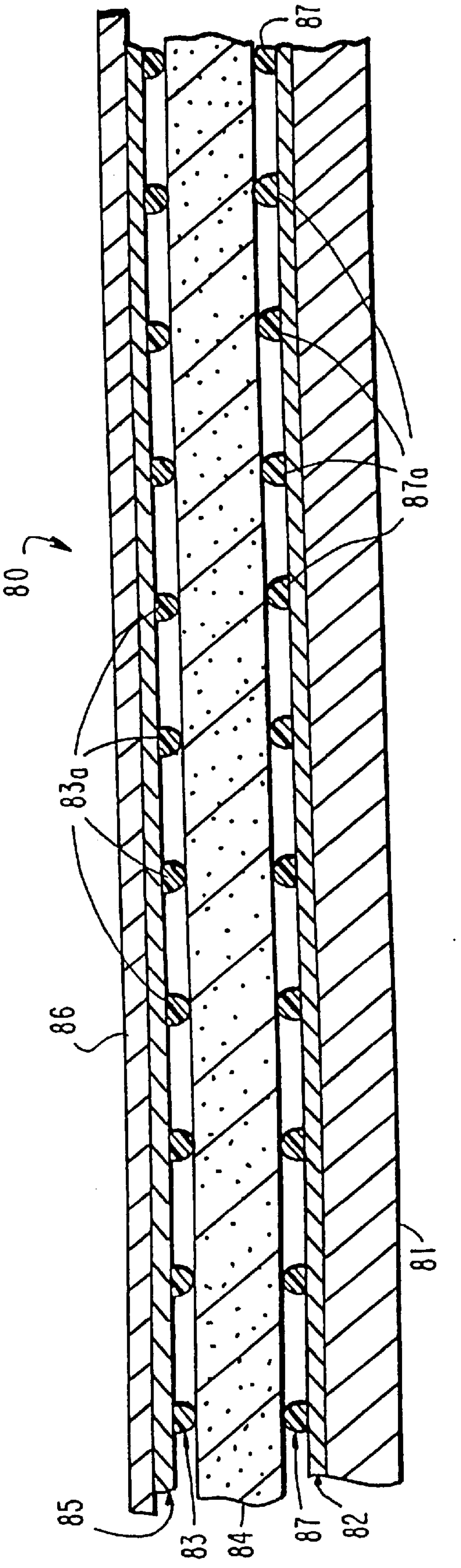
FIG. 3A is a sectional elevational view of an embodiment of the switching device having a dot standoff.

Referring to FIG. 3A, an embodiment 80 of the switching device is shown with a base 81, conductive layers 82 and 85, piezoresistive layer 84, cover sheet 86, and two standoffs 83 and 87, each of which is a layer comprising a plurality of discrete, laterally spaced apart beads, or dots 83$a$ and 87$a$, respectively, of insulating material. The dots 83$a$ and 87$a$ can be applied to the conductive layers 82 and 85, or to the top and/or bottom surfaces of the piezoresistive material, for example, by depositing a fluid insulator (e.g. synthetic polymer) through a patterned screen, then allowing the pattern of dots thus formed to harden or cure. For example, the material for use in fabricating the standoff dots 83$a$ and 87$a$ can be a polymer (e.g., methacrylate polymers, polycarbonates, or polyolefins dissolved in a solvent and applied to the conductive layers 82 and/or 85 as a viscous liquid). The solvent is then allowed to evaporate, thereby leaving deposited dots of polymer. Alternatively, the dots 83$a$ and 87$a$ can be deposited as a resin which cures under the influence of a curing agent (for example, ultra violet light). Silicones and epoxy resins are preferred materials to fabricate the dots 83$a$ and 87$a$.

The dots 83$a$ and 87$a$ are preferably hemispherical can be fabricated in any shape and are preferably from about 1/32" to about 1/4" in height. The amount of force necessary to switch on the device 80 depends at least in part on the height of the dots.

The operation and construction of the mat switch 80 is similar to that of mat switch 10 except that discrete dots 83$a$ and 87$a$ are employed as the standoff instead of a perforated continuous layer such as standoffs 15 and 13 of mat switch 10, or wire mesh layers such as mesh 19$a$ or 19$b$ as shown in FIG. 3.

The edges of the mat switches 10, 20, and 80 are preferably sealed by, for example, heat sealing. The active surface for actuation extends very close to the edge with little dead zone area.

Figure 11:
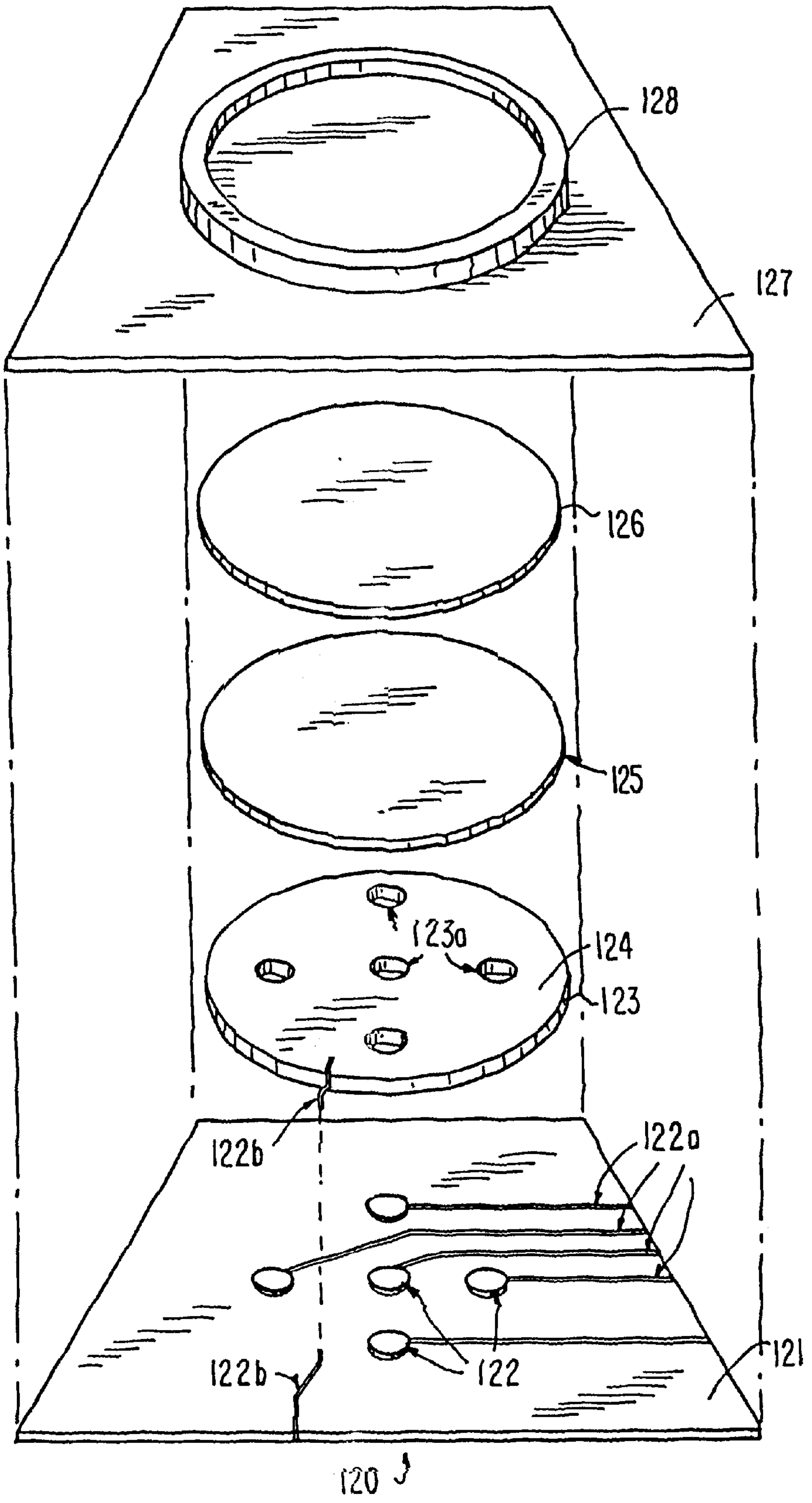
FIG. 11 is an exploded perspective view of an embodiment of the mat switch invention assembled in a frame.

Referring to FIG. 11 a pressure actuated switch 120 is shown retained by a frame wherein a frame cover plate 127 has an annular retaining ring 128. Elastomeric insulative cover sheet 126, piezoresistive foam 125 and spacer element 123 are retained by retainer ring 128. The spacer element 123 includes a metallized top conductive layer 124 which serves as the emitter electrode, and a plurality of apertures 123$a$. Bottom plate 121 includes a plurality of receiver electrodes 122 oriented in alignment with apertures 123$a$. Conductive leads 122$a$ extend from respective receiver electrodes to the edge of the bottom plate 121, to permit the current to be drawn off for measurement. A lead 122$b$ extending between the bottom plate edge and the conductive metal film 124 on top of the spacer element 123 provides a path for the source current to the emitter electrode 124.

Figure 12:
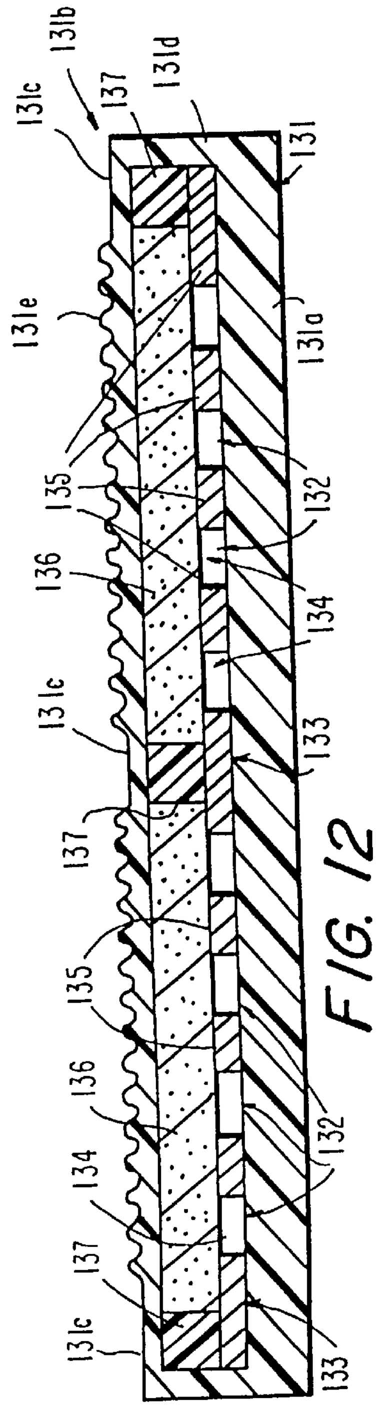
FIG. 12 is a sectional elevational view showing an embodiment of the mat switch invention including support struts.
Figure 13:
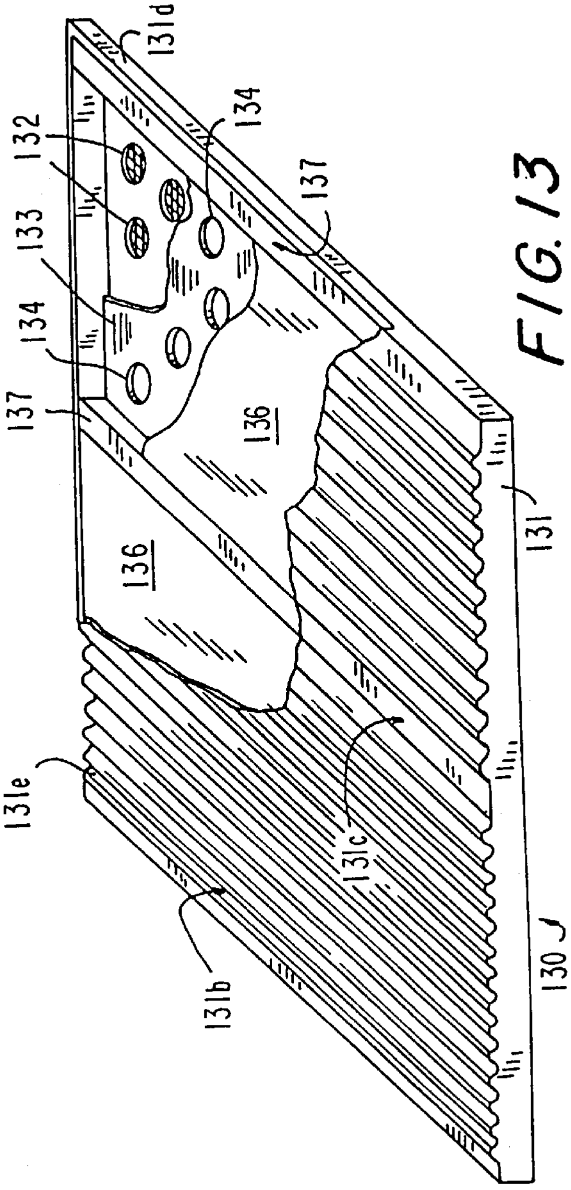
FIG. 13 is a partly cut away sectional view of the embodiment of the mat switch shown in FIG. 12.

Referring to FIGS. 12 and 13, an embodiment of the invention is shown with sealing struts. Mat switch 130 includes a sealed housing 131 having a base portion 131$a$ and cover portion 131$b$ having an upper surface with ribs 131$e$ and sealed at edges 131$d$. For example, the housing 131 can be fabricated from polyvinyl chloride which is heat sealed along edges 131$d$. The cover portion 131$b$ has a flat portion 131$c$ aligned with a strut 137 beneath it. Struts 137 are elongated rigid members which provide support for the mat switch 130 and which divide the piezoresistive layer 136 into sections.

The layer of piezoresistive foam 136 is positioned above spacer element 133 and is in contact with the upper, emitter electrode, i.e. conductive metal film 135 coated onto the top surface of the spacer element 133. Apertures 134 in the spacer element 133 permit the resilient piezoresistive foam 136 to make contact with receiver electrodes 132, thereby providing a current path between the emitter and receiver electrodes for the switched-on condition.

The operation of the mat switch 130 is similar to the operation previously described embodiments 20 and 120 wherein the emitter and receiver electrodes are both positioned on the same side of the piezoresistive material and are activated when, in response to activation force applied to the surface of the mat switch, the piezoresistive foam disposes itself through the apertures of the spacer element to complete the electric circuit by contacting the receiver electrodes aligned with the apertures.

The dead zone, or non-reactive area over struts 137 is minimized by having thin flat portions 131*c* of the cover portion 131*b* disposed above the struts 137, and having the portion with ribs 131*e* adjacent thereto. The support struts 137 and flat portions 131*c* are relatively narrow as compared to the width of the mat switch 130, and typically no more than about 0.125 inches wide. A force distributed only within that narrow strip of area may not be registered by the mat switch 130. However, under actual working conditions nearly all forces will be distributed over an area overlapping the flat portions 131*c*. The raised ribs 131*e* adjacent the flat portion 131*c* enable the cover portion 131*b* to be depressed at least a distance equal to the height of the ribs.

Figure 14:
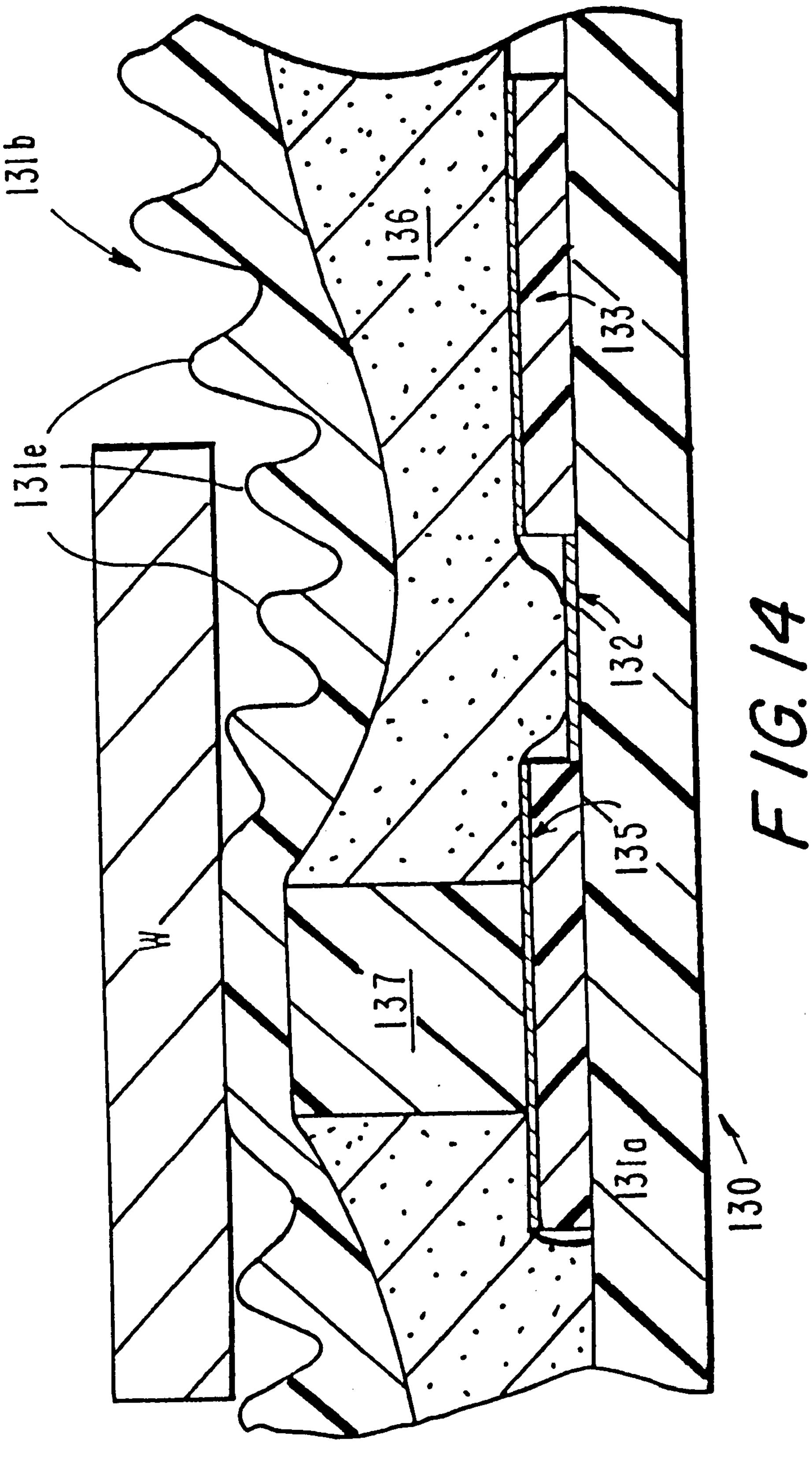
FIG. 14 is a detailed section of the strut area of the embodiment of the mat switch shown in FIG. 12 under compression.

For example, referring now to FIG. 14, it can be seen that when a force represented by weight W is rested on the cover portion 131*b* over flat area 131*c* and strut 137, the overlap of weight W contacts ribs 131*e*, thereby forcing cover portion 131*b* downward. This, in turn, biases the piezoresistive material 136 through aperture 134 and into contact with receiver electrode 132 to complete the electric circuit and put the mat switch in the "on" condition.

Figure 15:
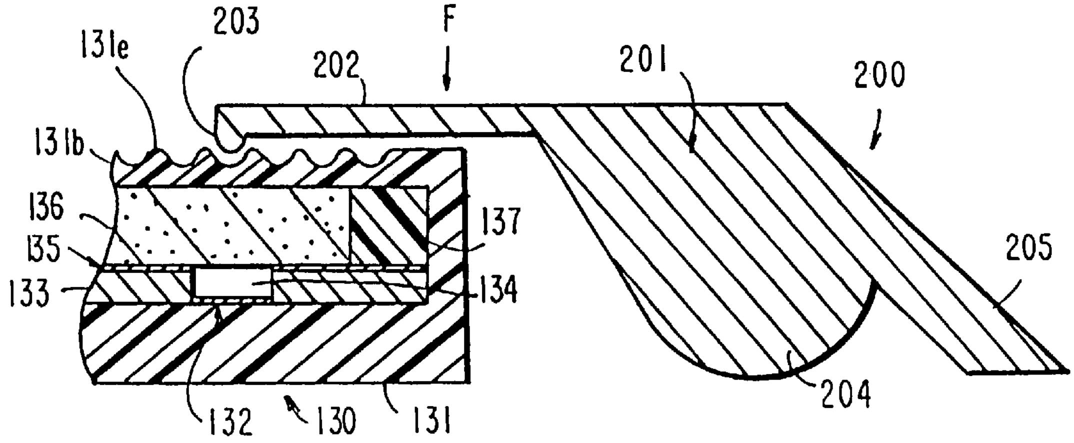
FIG. 15 is a sectional view showing a lever type edge device for eliminating dead area along the edge of the mat switch.
Figure 16:
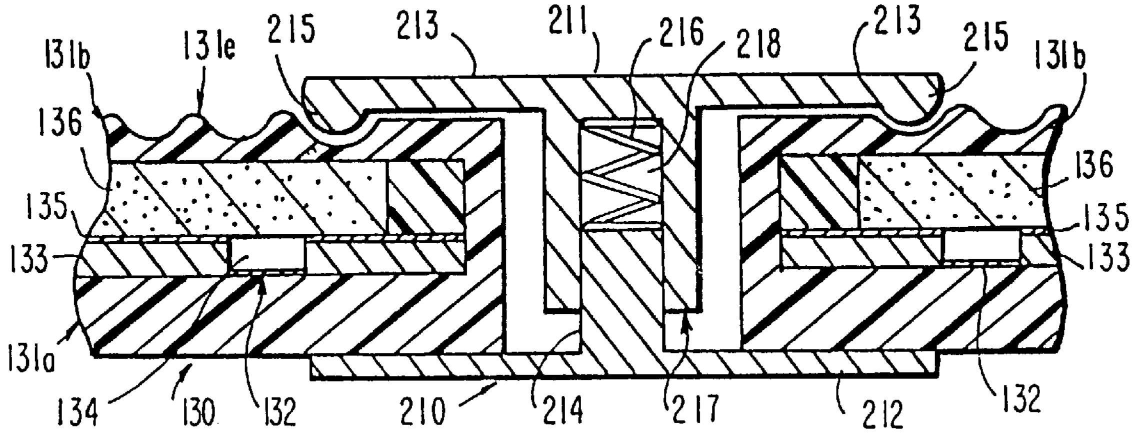
FIG. 16 is a spring biased coupling device for eliminating dead area along the edges of coupled mat switches.

Referring now to FIGS. 15 and 16, it is also contemplated to employ transmission means in conjunction with mat switch 130 to eliminate dead zones entirely. FIG. 15 illustrates a lever device 200 including an internal body 201 having an arm 202 with depending ridge 203, a curved base 204 and a stabilizing buttress 205. The lever 200 is elongated and is positioned adjacent the edge of the mat switch 130 such that ridge 203 engages a valley portion between two ribs 131*e* on the top surface of the cover portion 131*b*. The arm 202 extends over the edge of the mat switch 130. If a downward force F is applied to the arm 202, even though the position of the force F is aligned with an edge strut 137, the lever 200 will pivot to transfer the force to an active region of the mat switch where the force can be sensed. That is, the ridge 203 is above the piezoresistive material 136 such that downward force F will be shifted to compress the piezoresistive material.

The buttress 205 serves also as a counterweight to keep the lever 200 biased to a non-actuation, or untilted position, in the absence of downward force on the arm 202. Thus, the lever 200 is balanced such that when force F is removed the lever 200 rocks back automatically to its initial position.

Referring to FIG. 16, a coupling device 210 is shown for joining two mat switches 130 while eliminating the dead zone between them and along their respective edges. Coupler 210 includes an upper T-shaped portion 211 which is slidably engageable with upright post 214 of base 212. The upper T-shaped portion includes two arms 213 which over hang the respective mat switches 130. Each arm preferably has a depending ridge 215 for engagement with the ribbed upper surfaces 131*b* of the mat switches 130, as described above with respect to the engagement of ridge 203 with ribs 131*e*. The trunk portion 217 of the upper member includes an interior chamber 218 in which spring 216 is disposed. Spring 216 rests upon upright post 214 and resiliently biases the upper member 211 to an upward position wherein the ridges 215 do not apply any downward force upon the surface of the cover portion 131*b* of the mat switch. When a force is applied to the top surface of the upper T-shaped portion 211, the upper portion 211 slides downward against the biasing force of spring 216. This causes the arms 213 and ridges 215 to move downward thereby depressing the ribbed cover portion 131*b* and activating the mat switch 130. Force downwardly applied in what would otherwise be a "dead zone" is transferred to a active area of the mat switch 130, thereby eliminating the dead zone in actual use.

Figure 4:
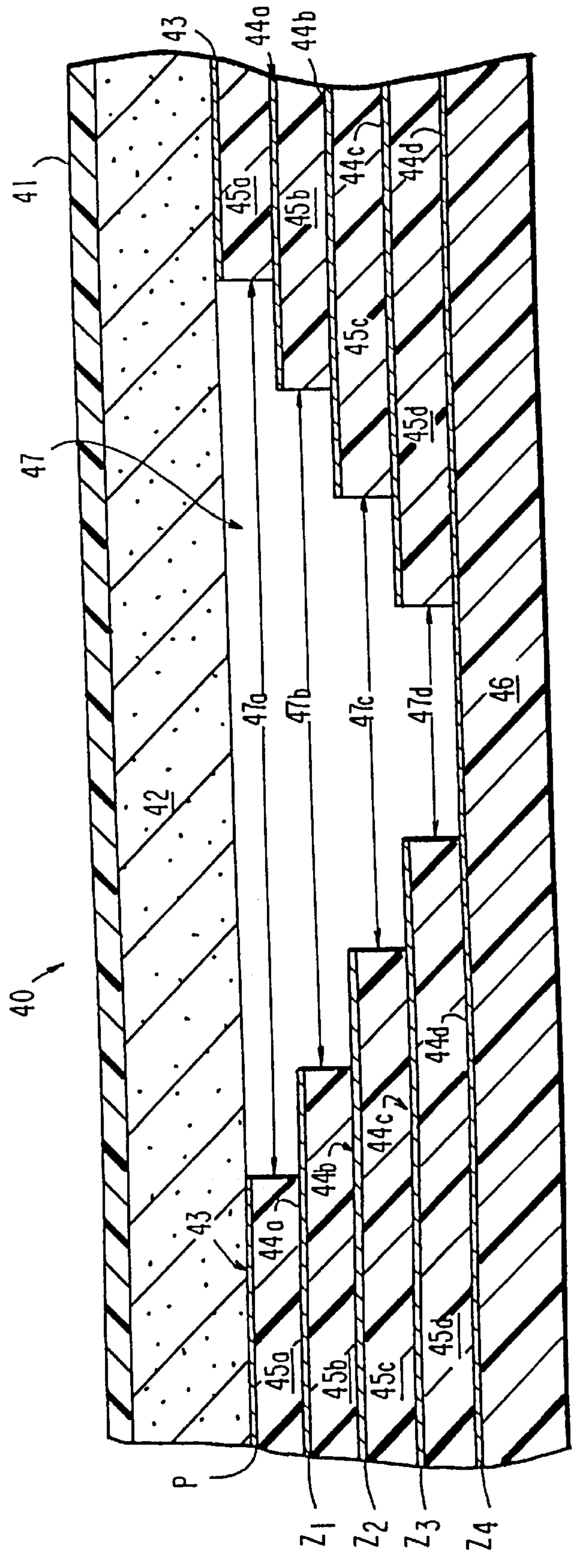
FIG. 4 is a sectional elevational view of a stacked multiple switching device.

Referring now to FIG. 4, an alternative embodiment 40 of the present invention is illustrated. Multiple switching device 40 includes a cover layer 41, a piezoresistive layer 42, a base 46, and an activation region 47 which is a void. The shape of activation region 47 is defined by a series of layered spacer elements 45*a*, 45*b*, 45*c*, 45*d*, and conductive layers 43 and 44*a*, 44*b*, 44*c*, and 44*d*.

More particularly, cover sheet 41 is a flexible non-conductive sheet preferably fabricated from an elastomeric synthetic polymer. The piezoresistive material 42 is preferably a piezoresistive cellular foam such as described above, and is positioned above the top conductive layer 43 with which the piezoresistive layer 42 is in electrical contact. The conductive layers 43, 44*a*, 44*b*, 44*c*, and 44*d* can be, for example, metallic foils adhesively bonded to the respective spacer elements directly below, or may be conductive coatings deposited thereon. The spacer elements 45*a*, 45*b*, 45*c*, and 45*d* are insulative layers of predetermined thicknesses, or heights. As shown in FIG. 4, the spacer elements have similar heights. However, they can also be fabricated with different heights. The heights determine the amount of pressure or force applied to the top of the multiple switching device 40 necessary to activate the next level of circuitry. Base 46 can be rigid or flexible and can be a tough non-conductive material as described above.

The activation region 47 is funnel shaped with stepped sides. As seen from the top it is preferably circular although angled shapes such as triangles, will also work. As can be seen from FIG. 4, the diameter of the opening 47*a* in the upper most spacer element 45*a* is greater than the diameter of opening 47*b* in spacer element 45*b*, each successively lower spacer element having an opening diameter less than the one above. The top conductive layer 43 is connected to a power source P and is designated as the "emitter" electrode. The remaining conductive layers 44*a*, 44*b*, 44*c*, and 44*d* are designated as the "receiver electrodes" and may individually be connected to different respective circuits $Z_1$, $Z_2$, $Z_3$, $Z_4$.

Figure 5:
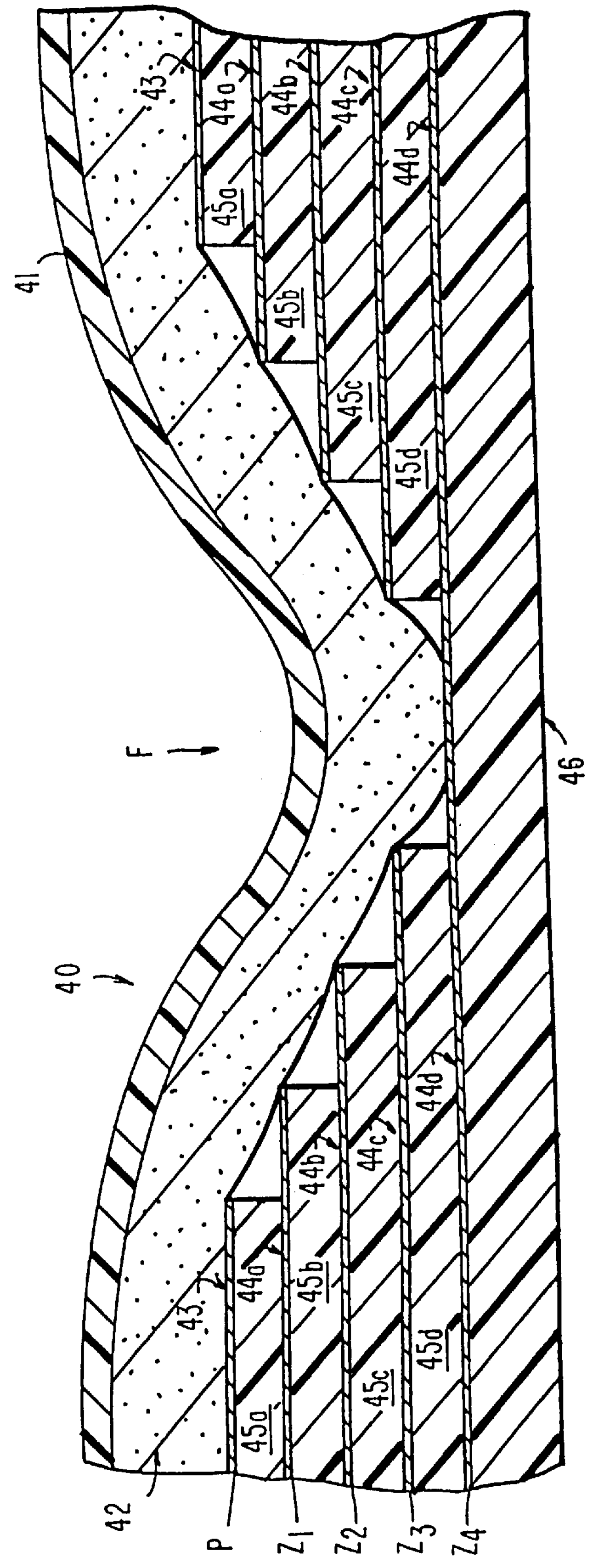
FIG. 5 is a sectional elevational view of the device of FIG. 4 under compression.

Referring now to FIG. 5, when the multiple switching device 40 is actuated by a force F pressing down on the cover sheet 41, the piezoresistive foam 42 is pressed down into the activation region 47, and makes electrical contact with one or more of the remaining conductive layers 44*a*, 44*b*, 44*c*, and 44*d* depending on the magnitude of force F. As each contact is successively made, a new circuit is actuated. Thus, for example, circuit $Z_1$ can be used to accomplish one function, circuit $Z_2$ can be dedicated to another purpose or other machinery, and so on for $Z_3$, and $Z_4$. Conductive layer 43 serves as the common emitter electrode providing the power for receiver electrodes 44*a*, 44*b*, 44*c*, and 44*d*.

While four spacer elements are shown in multiple switching device 40, it should be recognized that any number of spacer elements may be used, and the heights of the spacer elements may be varied in accordance with the application for which the device 40 is used. The spacer elements can optionally be fabricated from a rigid material.

Figure 6:
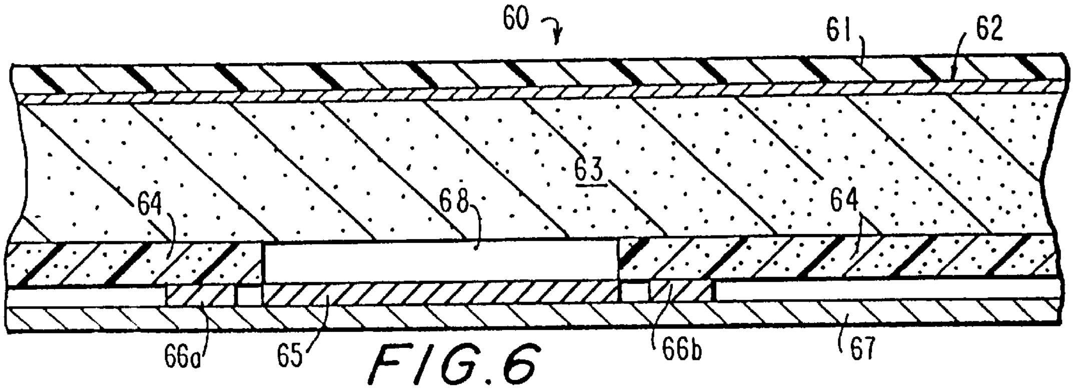
FIG. 6 is a sectional elevational view of an alternative embodiment of the present invention which detects shear force.

Referring to FIG. 6, an embodiment of the invention is shown which can detect a shear force, i.e., a force which is parallel to the plane defined by the planar top surface of the switching device. A force directed vertically downward onto the cover sheet in a direction normal to the plane defined by the top surface of the switching device has no shear component. However, if the downward force is at an angle from the vertical orientation it will have a vector component which is parallel to the plane of the top surface, this vector component constituting a shear force or stress.

As seen in FIG. 6, switching device 60 includes an insulative cover sheet 61 with a conductive film or coating 62 on the underside thereof. The conductive film 62 serves as an emitter electrode. The cover sheet 61 and conductive film 62 are preferably elastomeric. Piezoresistive foam layer 63 is beneath the conductive film 62 and is in electrical contact therewith Spacer element 64 is an insulative layer of cellular polymer and is resiliently deformable. Spacer element 64 has an aperture 68 defining a void space into which piezoresistive foam 63 can enter upon the application of a downward force to the cover sheet 61. Primary receiver electrode 65 is aligned with aperture 68 such that when the piezoresistive foam 63 is moved into aperture 68, contact is made between the piezoresistive foam 63 and primary receiver electrode 65 thereby closing the electric circuit and initiating the switching action as current flows between electrodes 62 and 65.

In addition to the primary receiver electrode 65, the shear detecting switch 60 includes at least one and preferably four or more secondary receiver electrodes 66*a* and 66*b* positioned around and laterally spaced apart from the primary receiver electrode 65, and covered by spacer element 64. Secondary receiver electrodes 66*a* and 66*b* can be connected to different electrical circuits.

Base 67 provides support for the device, the primary receiver electrode 65 and the secondary receiver electrodes 66*a* and 66*b* being mounted thereto. Base 67 can be fabricated from materials as mentioned above.

Figure 7:
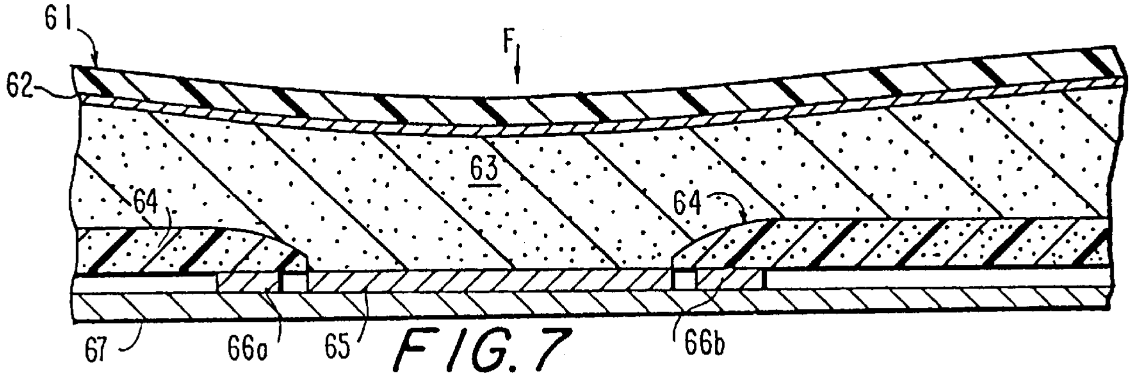
FIG. 7 is a sectional elevational view of the embodiment shown in FIG. 6 under vertical compression.
Figure 8:
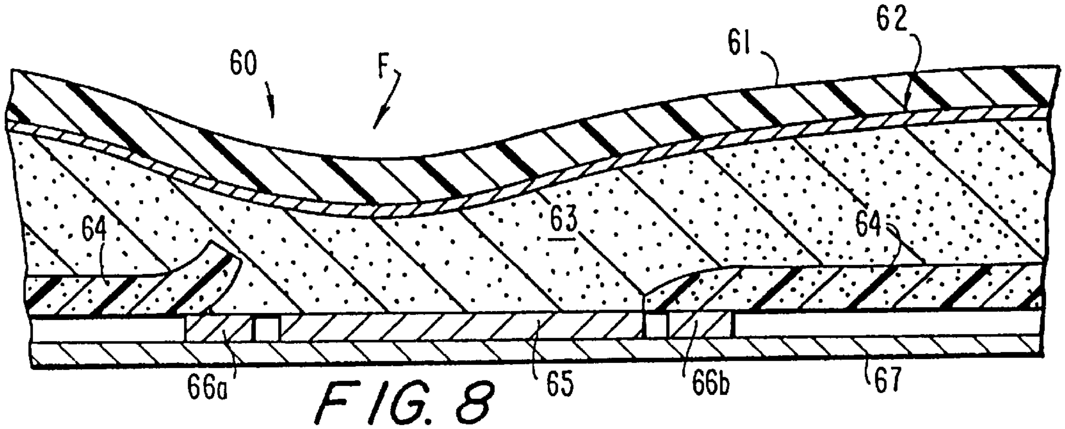
FIG. 8 is a sectional elevational view of the embodiment shown in FIG. 6 with applied shear stress.

Referring additionally now to FIGS. 7 and 8, it can be seen that when a force F is directed vertically downward on the cover sheet without any lateral vector component (i.e. without any shear stress) as shown in FIG. 7, the piezoresistive foam layer 63 fills aperture 68 and makes contact with the primary receiver electrode 65, but not the secondary receiver electrodes 66*a* or 66*b*. In FIG. 8, force F is shown having a shear component, i.e., force F is at an angle to the vertical orientation. As shown in FIG. 8, secondary receiver electrode 66*a* is on the side of the primary receiver electrode 65 in which the shear force is directed. Spacer element 64 is thereby moved to uncover secondary receiver electrode 66*a*, with which the piezoresistive foam makes electrical contact in addition to primary receiver electrode 65. Secondary receiver electrode 66*b* on side of the primarily receiver electrode 65 opposite to the direction of applied shear, remains covered and is not activated. Thus, the direction in which shear force is applied can be detected. Additionally, the magnitude of the vector components of force F can also be measured since the resistance of the piezoresistive foam will vary in accordance with the applied compressive force, as discussed above with respect to the aforementioned mat switching devices. When the shear force is removed, the spacer element resiliently returns to its initial configuration.

Figure 9:
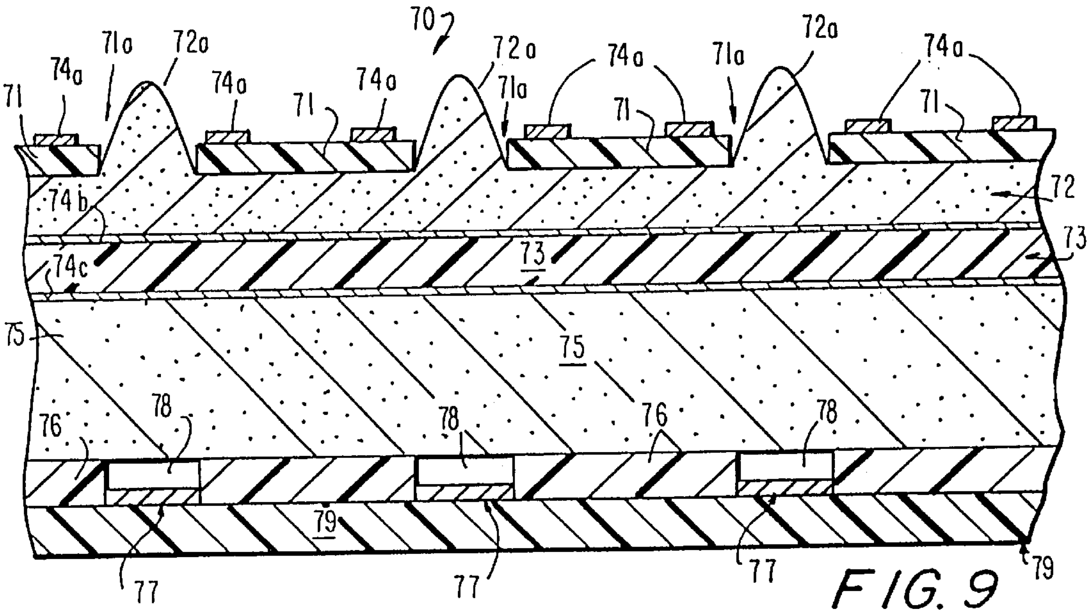
FIG. 9 is a sectional elevational view of an alternative shear detecting device.
Figure 10:
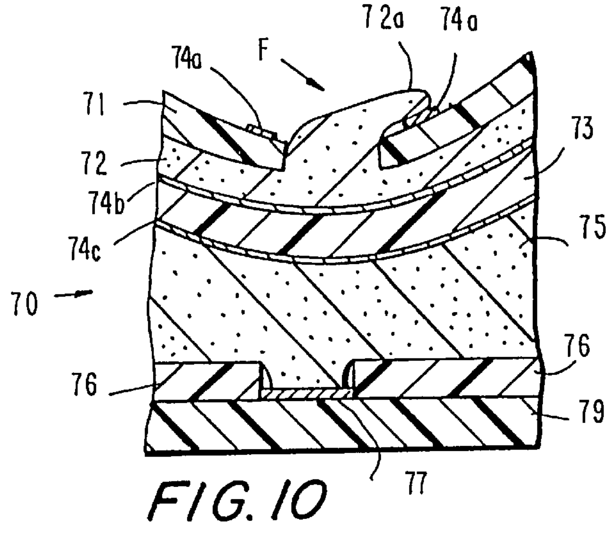
FIG. 10 is a sectional elevational view of the embodiment shown in FIG. 9 with applied compressive shear force applied.

Referring now to FIGS. 9 and 10, another shear detecting switching device 70 is shown. Switching device 70 includes an insulative base 79 with a patterned array of primary receiver electrodes 77 positioned in alignment with apertures 78 of a rigid insulative spacer element 76. A primary piezoresistive foam layer 75 is positioned above the spacer element 76 such that in the initial uncompressed configuration of the device 70, a gap exists between primary piezoresistive foam layer 75 and the primary receiver electrodes 77. Above the primary piezoresistive foam layer 75 is an elastomeric insulator sheet 73 having top and bottom conductive coatings 74*b* and 74*c*, respectively. The conductive coatings, or films, 74*b* and 74*c* serve as emitter electrodes and may be electrically connected to each other or to parts of different electrical circuits. A secondary layer 72 of piezoresistive foam is stacked above top conductive layer 74*b* and is in electrical contact therewith. The secondary piezoresistive foam layer 72 has a plurality of conical peaks 72*a* which project upward. Alternatively, 72*a* can be a conductive elastomer.

Insulative cover sheet 71 is positioned above the secondary piezoresistive foam layer 72 and has a plurality of apertures 71*a* through which conical peaks 72*a* are disposed such that the piezoresistive foam peaks 72*a* project above the top surface of the cover sheet 71. At least one, and preferably several, secondary electrodes 74*a* are disposed around each aperture 71*a* of the cover sheet 71 on the top surface thereof.

Referring now to FIG. 10, a downward force F with a shear component is applied to switching device 70. The primary piezoresistive layer 75 is moved through apertures 78 into contact with primary receiver electrodes 77. Also, the conical peaks 72*a* bend over in the direction of the shear force to make electrical contact with secondary receiver electrodes 74*a* thereby completing the electrical circuit path between top emitter electrode 74*b* and secondary receiver electrodes 74*a*. The direction and magnitude of both the shear can be measured by determining which of the secondary receiver electrodes 74*a* are activated and the amount of current flowing from the top emitter electrode 74*b* thereto. Likewise, the magnitude of the downward vector of the force can be determined from the current flowing from bottom emitter electrode 74*c* to primary receiver electrodes 77. Moreover, the lateral position of the force F on the top surface of the device 70 can be indicated by determining which of the primary receiver electrodes 79 are activated. Thus, a detailed measurement of position, magnitude and direction of an applied force can be made. The resolution of the measurement depends upon the number, size, and placement of receiver electrodes.

Corresponding mat switch 35 has tabs 36 configured and dimensioned to engage slots 32, and slot areas 37 for receiving tabs 31 of safety mat 30.

The tabs and corresponding slots provide mats 30 and 35 with the ability to interlock. Once engaged mat switches 30 and 35 are resistant to separation by a lateral force. It can readily be appreciated that tabs can be incorporated on more than one edge of the mat switch and that many mats can be interlocked to form a single contiguous structure. The mats may be connected electrically, as well as physically, in series or parallel circuits.

The mat switch construction of the present connection permits the active surface area of the mat to extend even into the tabs 31, 36. Thus, the tabbed area does not represent a dead zone.

Figure 17:
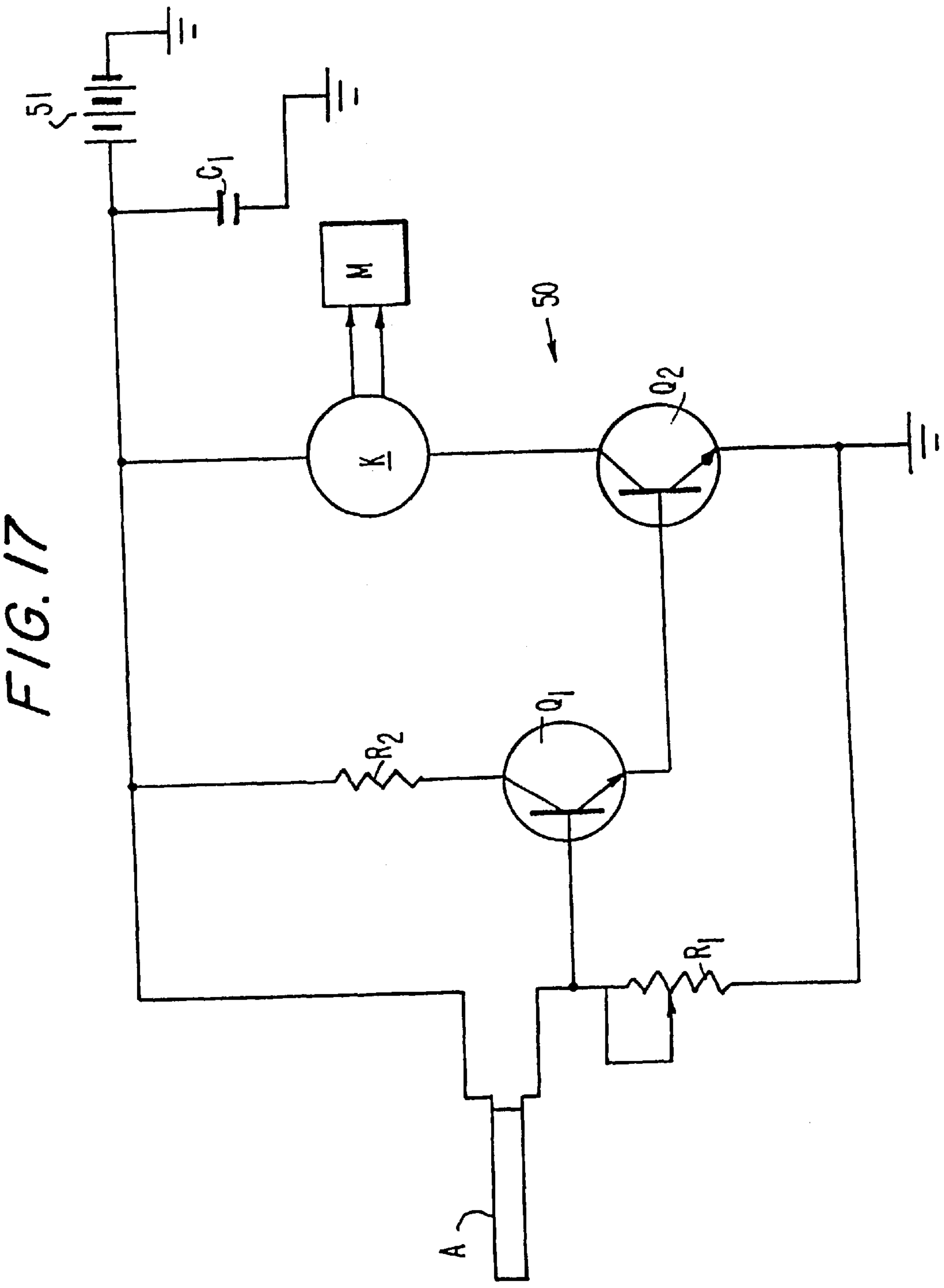
FIG. 17 is a diagram of an electric circuit for use with the apparatus of the present invention.

Referring now to FIG. 17, a circuit 50 is shown in which any of the mat switches of the present invention may be employed to operate a relay.

Circuit 50 is powered by a direct current source, i.e., battery 51, which provides a d.c. voltage $V_o$ ranging from about 12 to 48 volts, preferably 24 to 36 volts. The safety mat A can be any of the embodiments of the invention described above.

Potentiometer $R_1$ can range from 1,000 ohms to about 10,000 ohms and provides a calibration resistance. Resistor $R_2$ has a fixed resistance of from about 1,000 ohms to about 10,000 ohms. Transistors $Q_1$ and $Q_2$ provide amplification of the signal from the safety mat A in order to operate relay K. Relay K is used to close or open the electrical circuit on which the machinery M to be controlled operates. Capacitor $C_1$ ranges from between about 0.01 microfarads and 0.1 microfarads and is provided to suppress noise. K can be replaced with a metering device to measure force at A. This would require adjusting the ratio of $R_1$ and A (compression vs force) to bias transistors $Q_1$ and $Q_2$ into their linear amplifying range. This circuit represents an example of how the mat may be activated. Many other circuits including the use of triacs can be employed.

The various electrodes of the mats switches 40, 60, and 70 may be incorporated into separate electrical circuits of the type shown in FIG. 17. Activation of the relay corresponding to a particular circuit would then indicate that longitudinal pressure or shear force of a certain magnitude or in a certain position on the mat has occurred. The multiple outputs of the relays may be the input of a preprogrammed guidance control, or other control or response means.

The present invention can be used in many applications other than safety mats for machinery. For example, the invention may be used for intrusion detection, cargo shift detection, crash dummies, athletic targets (e.g. baseball, karate, boxing, etc.), sensor devices on human limbs to provide computer intelligence for prosthesis control, feedback devices for virtual reality displays, mattress covers to monitor heart beat (especially for use in hospitals or for signalling stoppage of the heart from sudden infant death syndrome), toys, assisting devices for the blind, computer input devices, ship mooring aids, keyboards, analog button switches, "smart" gaskets, weighing scales, and the like.

It will be understood that various modifications may be made to the embodiments disclosed herein. Therefore, the above description should not be construed as limiting, but merely as exemplifications of preferred embodiments. Those skilled in art will envision other modifications within the scope and spirit of the claims appended hereto.

What is claimed is:

1. A pressure actuated switching device, which comprises:

a) a layer of compressible piezoresistive material;

b) a base below said layer of piezoresistive material;

c) at least two insulative spacer elements positioned between said piezoresistive material and said base, said spacer elements each having an upper layer of conductive material, and each insulative spacer element having at least one aperture, said apertures being aligned, configured, and dimensioned to form at least one void defined by stepped sides said void has a relatively large diameter opening adjacent the piezoresistive material and a relatively small diameter opening adjacent the base.

2. The device of claim 1 wherein said at least two spacer elements form a stack of spacer element layers having a conductive layer on an uppermost spacer element layer, said conductive layer being in electrical contact with said piezoresistive material.

3. The device of claim 2 wherein said piezoresistive material is a foam material resiliently movable in response to downwardly directed force applied thereto through said void and into successive contact with at least one other conductive layer.

4. The device of claim 3 wherein said at least one void is generally conical in shape.

5. The device of claim 1 further including an insulative flexible cover sheet disposed above said layer of piezoresistive material.

6. The device of claim 1 wherein said spacer elements are fabricated from a rigid material.

7. The device of claim 1 wherein said base comprises an insulative layer and a conductive material, said conductive material being joined to an upper surface of said insulative layer.

* * * * *